United States Patent [19]

Mosser et al.

[11] Patent Number: 4,683,157

[45] Date of Patent: Jul. 28, 1987

[54] THIXOTROPIC COATING COMPOSITIONS AND METHODS

[76] Inventors: Mark F. Mosser, 485 Washington Ave., Sellersville, Pa. 18960; William J. Fabiny, 1105 Continental Dr., Harleysville, Pa. 19438

[21] Appl. No.: 777,364

[22] Filed: Sep. 18, 1985

Related U.S. Application Data

[62] Division of Ser. No. 441,754, Nov. 15, 1982, Pat. No. 4,548,646.

[51] Int. Cl.$^4$ .......................... B32B 3/02; B32B 15/08
[52] U.S. Cl. ...................................... 428/65; 106/1.12; 106/14.12; 106/14.21; 148/6.16; 428/371; 428/377; 428/450; 428/457

[58] Field of Search ................. 106/1.12, 14.12, 14.21, 106/1.25; 148/6.16; 428/457, 450, 65, 371, 377

[56] References Cited

U.S. PATENT DOCUMENTS 4,537,632  8/1985  Mosser ........................... 106/1.12 X Primary Examiner—Thomas J. Herbert
Attorney, Agent, or Firm—Weiser & Stapler

[57] ABSTRACT

Metal part coated with a cured coating composition comprising (a) an acid aqueous solution of phosphate ions and ions of chromate or molybdate, (b) an acid-stable amorphous silica and (c) a non-ionic surfactant wherein the silica is crosslinked with the surfactant.

9 Claims, No Drawings

THIXOTROPIC COATING COMPOSITIONS AND METHODS

This application is a divisional application of Ser. No. 441,754, filed Nov. 15, 1982 now U.S. Pat. No. 4,548,646 entitled Thixotropic Coating Compositions and Methods.

This invention relates to stable thixotropic coating compositions which are ideally suited for application to parts to be coated by dipspinning or dipping in the metal parts. The coated metal parts excel in performance in that they are highly resistant to atmospheric and other environmental conditions to which they are exposed.

The invention also relates to the metal parts coated with such compositions and to a method for coating metal parts. More particularly, the invention relates to acid phosphate aqueous compositions which comprise certain defined amorphous silicas and a nonionic surfactant. The invention also relates to compositions useful for making the coating compositions of the invention.

It is known that phosphate coatings are useful to protect metal surfaces. Traditionally the method of application has been by spraying, dipping or other methods of application. Because of the relatively fluid nature of traditional phosphate compositions, there is a considerable loss and waste of the coating composition and/or an incomplete coating of more intricate metal parts. Until now, there has been no fully satisfactory coating composition for coating metal parts of intricate configuration by dipspinning or similar method. Various attempts to thicken coating compositions such as with diatomaceous earth have been unsatisfactory. Other additives to coating compositions (such as phosphate compositions) like hydroxymethyl cellulose, polyvinyl acetate, modified sugars, latex and other synthetic organic materials and resins have been unsatisfactory. When thickeners like alginates, gum or others are used, the composition must be buffered at a high pH to avoid splitting (scissoring) the polymeric thickener. Such a higher pH is not acceptable for the practice of the invention. It is known that such thickeners are split primarily because of the chromate (dichromate) ions at prevailing low pH. The present invention uses chromate at a low pH, and yet the additives (amorphous silicas and the nonionic surfactant) are stable in the medium.

U.S. Pat. No. 3,856,568 to Tanaka discloses a coating solution containing colloidal silica which improves iron loss and other properties or oriented silicon steel sheets.

U.S. Pat. No. 2,465,247 to McBride discloses the treatment of ferrous, zinc and cadmium metal surfaces with a paste-like composition to produce a phosphate coating and a readily removable powdered layer upon drying. The paste-like composition is produced by supplying a porous silica aerogel with an aqueous solution capable of producing phosphate films. An anionic surfactant, an alkyl aryl sulfonate (like Naconal) is also a component of the composition. The coating on drying has a loose fluffy aerogel layer that comes off readily by wringing, brushing or with a blast of air.

Gilchrist (U.S. Pat. No. 3,615,741) discloses chromium-containing compositions including a hydrated chromic oxide and a hydrophobic organic acid which contribute to a thickening or gelling of the product. The product has an alkaline pH above 7, usually 8 to 9. Kendall (U.S. Pat. No. 3,535,629) discloses a non-aqueous paint remover which contains pyrogenic silica, in addition to other traditional components. Ayres (U.S. Pat. No. 3,420,715) discloses phosphate coating solutions that include a nonionic detergent as a cleaning agent which is consumed entirely.

The problem of providing satisfactory coatings for application by dipspinning has been made even more difficult with phosphate- or phosphate-chromate- (or -molybdate) containing coating compositions because these typically have a very low pH which has caused the coating composition and/or the additive to be unstable.

For quite some time there has been a need to coat metal parts by what is called the dipspin or Filwhirl methods. In these methods, the parts are painted in bulk, that is by the basketful, avoiding time consuming handling of individual pieces. Irregularly shaped parts such as coils, springs, screws, valve and wheels, casting, bolts, washers, fasteners, etc. are coated by such method. The dipspin coating method reduces spray paint costs significantly and covers even difficult to reach or normally inaccessible surfaces. The method eliminates sagging of the finish and parts need not be hung individually for drying. In the method, the parts are loaded into a removable work basket and then dipped into a tank or drum of the coating composition. After immersion, the filled basket is raised, allowed to drain momentarily and then set into the machine. The basket is spun to remove excess coating after which it is taken out and the parts dumped onto a screen to dry. The parts can also be dried by spinning in the machine. Any surplus coating which is thrown off the parts generally flows through an outlet and is collected and recycled to the tank. The Filwhirl process is a modification wherein the basketful of parts to be coated is in a vat to which the coating is pumped to flood the basket, which is then spun. The speed of revolution widely varies depending on the basket size and nature of equipment. Such equipment is known to be operated in ranges from about 80 rpm to about 550 rpm, also at about 900–1,200 rpm. The parts are then dried. The coating is cured in accordance with generally applicable curing temperatures, such as in the range of 350° F. to about 1,000° F., or typically 525° F. to about 650° F. for adequate curing time.

Until this invention, there has been no satisfactory coating which is fluid enough to reach into and/or cover the concave or intricate portions of a metal part to be coated, and yet not so fluid as to throw off much of the coating during the spinning cycle so that the part is not completely coated with the composition. The coating compositions of the invention satisfy all these requirements. Moreover they remain stable, i.e. do not significantly settle or classify into various components or layers for several months at room temperature. The major proportion of the pigment does remain in suspension and does not settle at the bottom of the container. This is an important requirement when the composition is to be used over and over again or when shipped from the manufacturer to the applicator.

In accordance with the invention, a particular coating composition has now been found which is thixotropic and which is stable, i.e. does not classify or separate into its components, upon long storage periods (shelf stability) under conditions of use. Indeed, typical coating compositions of the invention have remained stable for more than three months upon storage at operating conditions such as in the range of 25° to 30° C. When pigments (metals or non-metals) are also constituents of the coating composition of the invention, no settling of the pigment has been observed out of the slurry.

A particular advantage of the coating composition is that it is ideally suited for application by the dipspin technique.

Moreover, the coated parts, e.g. metal parts, have a combination of unusual and unique properties in that they are resistant to corrosive atmospheric conditions, particularly extreme salt spray exposure, heat exposure and humidity. The coated parts may be, if desired, further treated such as to render them galvanically active. Also top coats, with pigments if desired, may be applied.

The invention contemplates an acid stable thixotropic coating composition which comprises an acid binder aqueous solution and other ingredients. These ingredients are in accordance with the invention, a nonionic surfactant and certain amorphous silicas. These are described further below.

The acid thixotropic compositions of the invention are constituted or made from aqueous solutions which preferably contain phosphate anions and chromate (or dichromate) and/or molybdate anions. A great variety of such solutions are known for treatment of metal surfaces. For instance Kirk and Othmer, Eds., *Encyclopedia of Chemical Technology*, 2nd ed. vol. 18, Interscience Publishers, a division of John Wiley & Sons, Inc., 1969 (pages 292-303) describes phosphate and chromate coatings. The United States patent literature describes coating solutions or dispersions for protective coating of metals, which compositions are suitable for use as components of the compositions of the invention. Such suitable compositions are disclosed by Allen (U.S. Pat. No. 3,248,251); Braumbaugh (U.S. Pat. No. 3,869,293); Collins (U.S. Pat. No. 3,248,249); Wydra (U.S. Pat. No. 3,857,717); Boies (U.S. Pat. No. 3,081,146); Romig (U.S. Pat. No. 2,245,609); Helwig (U.S. Pat. No. 3,967,984); Bennetch (U.S. Pat. No. 3,443,977); Hirst (U.S. Pat. No. 3,562,011) and others. These disclosures are incorporated herein by reference. Other illustrative patents or literature showing corrosion inhibiting and protective coating compositions of phosphates, mixtures of phosphates and chromates and/or molybdates are known to one skilled in the art and further examples need not be supplied.

In accordance with the invention such phosphate compositions comprise the two additives; the nonionic surfactant and the specified amorphous silicas which constitute the thixotropic coating compositions of the invention.

It is noteworthy that in accordance with the invention, a greater latitude is provided in the type of phosphate compositions which can be used with the specified additives. For instance, with respect to the above-mentioned Allen patent (U.S. Pat. No. 3,248,251), it is not necessary that the phosphate binder be confined to the various concentrations and other molar relationships disclosed by that patent. The present invention, therefore, allows for the use of a large number of and a great variety of acid binder solutions for making the thixotropic coating composition in accordance with the invention. In accordance with the invention, the stable thixotropic coating composition of the invention comprises, in addition to the acid binder which comprises phosphate ions and ions of the group of chromate or molybdate ions, an amorphous silica of the type defined below.

In accordance with the invention, there is provided the liquid acid solution containing phosphate ions and, optionally, an inorganic particulate solid material (which may be a metal or not), of aluminum or a ceramic material. The liquid acid solutions do not contain such solid materials; however, the other ingredients of the invention are suitable as top coats, sealers, etc.

Those solutions which contain the particulate solid materials, like metals, are generally referred to as "binders". The amorphous silica ingredient used in the coating composition of the invention is a substantially dehydrated, polymerized silica which may be considered as a condensation polymer of silicic acid. Such amorphous silicates are known. It is generally accepted that the amorphous silicas are usually categorized as silica gel, precipitated silica, fumed silica or colloidal silica. For the purpose of this invention it has been found that the fumed silica, precipitated silica and silica gel are ideally suited. Colloidal silica or silica sol (as it is also called) is not a suitable silica for use in the compositions of the invention. Unlike the silicas which are useful, colloidal silica is known to be a suspension of silica particles in water. Such silica sols contain a trace of sodium or other alkali metal ions to stabilize the colloid. The amorphous silicas used in accordance with the invention are free of stabilizing alkali metal ions (or equivalent ions) or other counter-ions, and are not in the form of a suspension.

In contrast, the other types of silicas, namely the precipitated silica, the fumed silica and the silica gel are ideally suited for the purpose of this invention.

For further reference to amorphous silica, reference may be made to Kirk and Othmer, *Encyclopedia of Chemical Technology*, vol. 18, pages 61-72, which are incorporated herein by reference.

Also, reference is made to *Ultrafine Particles*, Kuhn, Lamprey and Sheer, John Wiley & Sons, Inc., New York, N.Y. 1963, especially pages 197 through 205, which describe physical characteristics and other properties of such silicas, also incorporated herein by reference.

The silica gel used in accordance with the invention is generally of low, intermediate or high density. The apparent bulk density may vary from about 0.67 to about 0.17; the apparent particle density from about 1.1 to about 0.75 and the true particle density is about 2.20. The average pore diameter may vary from about 22-26 to 180-220 angstrom; the pore volume (ml/g) from about 0.37 to about 2.0 and the surface area ($m^2/g$) from about 750-800 to about 100-200.

Typical fumed silica used in accordance with the invention generally has the following characteristics:
silica content (dry basis) %: 99.7-99.99
particle size (micron): 0.007-0.05
surface area ($m^2/g$): 50-400
bulk density ($lb/ft^3$): 2.3-7
loss on ignition (1000° C.)
moisture free basis: 0.5-2.5

Generally, the fumed silica prepared from silicon tetrachloride by high temperature hydrolysis is about 98.8% $SiO_2$. It consists of clusters of particles, 10-40 millimicrons in size with a surface area of 250 to 300 $m^2/g$ and a refractive index of about 1.4. The particles have a negative charge. The surface area of the products, the outside surface of the spheres and the surface itself consists of both silanol groups and siloxane groups, which have been determined to be 1 silanol group for every 30 sq. angstroms of surface. A preferred fumed silica (or silicon dioxide) is that available commercially under the name of Cab-O-Sil. Cab-O-Sil is described as constituted of silica spheres averaging 7 to about 14 millimicrons. The final surface areas may range from 400 square meters per gram through 200 square meters per gram, respectively.

The amorphous silicas preferred for use in accordance with the invention have an average particle size of less than about 1 micron. In the process of making the fumed silicon dioxide, the molten spheres collide and fuse with one another to form branched, three dimensional chain-like aggregate. Certain Cab-O-Sil grades of materials have increased density which raises the bulk density from an average value of 2 pounds per cubic foot to more than 4 pounds per cubic foot.

Another form of silica used in accordance with the invention is precipitated silica. Such silica has generally a particle size of about 20 to about 50 millimicrons and forms an agglomerated particle of about 1 to 5 microns. Precipitated silica has a surface area generally of about 100 to 200 m$^2$/g. Typical properties of precipitated silica are given below.

| | | |
|---|---|---|
| SiO$_2$ (%) | 85 | 87.5 |
| CaO (%) | 0.1 | 0.75 |
| R$_2$O$_3$ (%) | 0.14 | 0.95 |
| NaCl (%) | 0.04 | 1.6 |
| Na$_2$O (%) | 0–1.5 | 1.0 |
| loss (105° C.) (%) | 5–6 | 6.3 |
| loss (1200° C.) (%) | 11.0 | 10.0 |
| ultimate particle size, (micron) | 0.012 | 0.022 |
| sintering temperature (°C.) | 500–700 | 500–600 |
| surface area (m$^2$/g) | 200–400 | 140–600 |
| pH | 4–8.5 | 6.5–7.3 |
| bulk density (lb/ft$^3$) | 4–10 | 15 |
| refractive index | 1.45 | 1.46 |

In general, the amorphous silicas used in accordance with the invention are characterized in that they have a surface which is partially or completely hydroxylated. The hydroxyl groups are capable of cross-linking with the other ingredients of the composition, especially the nonionic surfactant.

Those amorphous silicas which to date have not been found to be suitable for the invention are silica sols of which a description of general characteristics is presented below.

| Silica sol | | | |
|---|---|---|---|
| pH | SiO$_2$ (%) | Particle Diameter | |
| Syton$^a$ | 30 | up to 500 millimicrons majority 80–140 millimicrons | 9.8 |
| Ludox$^b$ | 15–30 | 10–30 millimicrons; av 17 millimicrons | 8.5–10.5 |
| Nalcoag$^c$ | 30–50 | 13–50 millimicrons | 8.5–10.0 |

$^a$Monsanto Inorganic Chemicals Div.
$^b$E. I. du Pont de Nemours & Co., Inc.
$^c$Nalco Chemical Co.

These colloidal silicas are relatively unstable at the operative low acidic pH and have ions of opposite charge including those of the other ingredients present in the composition (often sodium ions).

In accordance with the invention the proportion of amorphous silica used in the coating compositions is within a comparatively limited range. Preferably, the amount of amorphous silica is in the range of about 0.5 to about 15%, preferably about 1 to about 5%, most preferably 1 to about 3% based on the total solids of the composition. A higher percentage of amorphous silica may be used but this tends to be to the sacrifice of the resulting cured film which then tends to be too brittle for certain applications. With usual handling and without special precautions, the coating will not adequately adhere and will fall off. Also, if the amount is too high, it may interfere with burnishing and not become electroconductive. If the amount of amorphous silica is decreased appreciably below about 1%, then this may be at the sacrifice of the other desirable properties of the coating compositions.

In accordance with the invention, the acid-stable thixotropic coating compositions of the invention comprise in addition, a water-soluble, acid-stable nonionic surfactant which is capable and does form a three dimensional, cross-linked network with the amorphous silica. Preferably, the surfactant is an ethoxylated alkylphenol or alkylphenoxypoly (ethyleneoxy) ethanol, an ethoxylated aliphatic alcohol; polyoxyethylene, a carboxylic ester like a glycerol ester (mono- or di-); and other equivalent nonionic surfactants. Typical suitable ethoxylated alkylphenols are alkylphenols of C$_8$ to C$_{12}$ alkylphenols. It is most preferred that they be water-soluble, those having at least 60 weight percent of polyoxyethylene groups being particularly well suited. Such ethoxylated alkylphenols are well-known under various trademarks such as Igepol, Levelene, Neutronyx, Solar NP, the Surfonic series, and the Triton N and X series, just to name a few. It is to be noted, however, that the solubility of a particular nonionic surfactant in water is not necessarily determinative and not as important as its ability to cross-link with the amorphous silica. What is most important is that the surfactant be soluble enough to cross-link with the silica. It is to be noted that a particular nonionic surfactant may have limited solubility in an aqueous system (a 2-phase system) yet may be quite effective in the system of the invention because its limited solubility will be adequate to cross-link with the amorphous silica in the system of the invention (which is a multi-phase system).

Among the polyoxyethylenes suitable for use in accordance with the invention are the mono- and dialkyl ethers of ethylene glycols and their derivatives. Typical of other nonionics are the monobutyl ether, ethylene glycol monobutyl ether acetate, ethylene glycol monoethyl ether acetate, ethylene glycol dibutyl ether, ethylene glycol monohexyl ether, ethylene glycol monomethyl ether, ethylene glycol monomethyl ether acetate, ethylene glycol monophenyl ether and other equivalent ethers of ethylene glycol. Another group of nonionics particularly well suited for the preparation of the thixotropic coating compositions of the invention are the polyethylene glycols and the alkoxy derivatives, particularly lower alkoxy, such as methoxy polyethylene glycol; also diethylene glycols, propylene glycol and other similar glycols.

Suitable nonionic surfactants for use in the invention are disclosed in Kirk & Other, *Encyclopedia of Chemical Technology*, vol. 19, pages 531 to 554, entitled "Nonionic Surfactants," which is incorporated herein by reference. The nonionics used herein are adequately stable and inert to the acidic conditions prevailing in the binder and the compositions of the invention to be effective for the purpose intended.

It is an aspect of the invention that the nonionic surfactant be capable and does form a three dimensional cross-linked network with the amorphous silica. This appears to protect it from being chemically attacked by the acidic chromate. Other polyfunctional chemicals which do not have that desirable property are not suitable for use in this invention. The cross-linking of the two above named components is, in the case of fumed silica, normally through and at the silanol and/or the siloxane groups.

In the compositions of the invention, the ingredients are subjected to particularly extreme conditions in terms of very low pH and highly oxidizing conditions due to the hexavalent chromium ions ($Cr^{+6}$), which normally cause hydrolysis of chemical compounds having polar groups (esters, ethers, etc.), oxidation of aldehydes and carboxylic acids to cleave the carbon to carbon linkages and decarboxylation. Since it is known that the chromate ion in basic solutions is less oxidizing, it might have been thought desirable that the compositions have a higher pH for greater stability; however, that has not been found to be necessary or desirable.

Small amounts of the nonionic surfactant unexpectedly contribute favorably to the properties of the composition. Amounts below those preferred, however, result under the tested conditions, in cured coatings which do not have all optimum properties. Accordingly, it is preferred that the coating compositions contain from about 0.01 to about 5% by weight and more preferably about 0.02 to 0.6% by weight of the surfactant and more based on total solids. It was unexpected that such a modest amount of surfactant has such a significant beneficial effect; larger amounts appear to adversely affect the consistency of the desired composition.

In accordance with the invention, the sequence of admixing the amorphous silica and the nonionic surfactant with the phosphate coating solution is not critical. Either one of these two components may be first admixed to the phosphate solution which may optionally contain the solid particulate material, to form an intermediate liquid composition, and then the second component may be admixed to form the thixotropic coating composition.

When as is often desired, a solid particulate material for example a metal like aluminum or silicon is to be a component of the composition, it is generally preferred that it be admixed at least by the time of the addition of the other two components of the invention, the amorphous silica and the nonionic surfactant. A preferred manner of preparing the coating compositions of the invention is to admix to the phosphate (chromate and/or molybdate-containing) binder the particulate material (like a metal) under vigorous mixing conditions, then admix the amorphous silica and then the nonionic surfactant. Upon addition of the latter two components, the viscosity increases remarkably due to the interaction of the latter two components. Gradually after preparation of the composition, the viscosity will generally decrease to reach a stable level and remain essentially constant thereafter. Even at that level the viscosity is significantly higher than that of compositions known heretofore, and the composition is thixotropic.

The sequence of addition of the components of the phosphate solutions is not critical either, as is disclosed in the prior art, for instance the Allen U.S. Pat. No. 3,248,251.

In accordance with the invention, the stable thixotropic coating composition may have a viscosity in the range of about 600 to about 45,000 centipoise (cp), for optimum properties, generally a viscosity in the range from about 800 to 16,000 is used depending on pigmentation and composition type. A viscosity in the range of 800 to 4,500 cp is satisfactory for the purpose of the invention. It will be noted that generally the viscosity of the composition may be in the upper ranges or even outside of this range just soon after the ingredients have been combined and then level off within the ranges stated. The composition of the invention has a gel-like to milkshake like consistency. The color of the composition may have any color depending on the pigment used. Compositions of various shades of green to greys and white to black, have been prepared, depending on the pigment components. They are suitable as described above for application to the part to be coated, then dried and cured.

The pH of the composition is preferably in the range of about 0.5 to about 3.0, preferably in the range of 1.5 to about 2.0.

It will be noted that although these ranges of amounts for the two additives used with the invention are given as a guidance, it is contemplated that by varying one or more of the ingredients of the composition and if more specialized applications are desirable, there are circumstances in which one skilled in the art may wish to prepare a thixotropic coating composition where one or more of the ingredients may be outside of the specified limits. For instance, it is contemplated that compositions of higher viscosities will produce ultra thick coatings which though not as desirable for metal parts with intricate shapes and forms or closer fittings, are quite suitable for other metal parts to be coated. It is also contemplated that such higher viscosity coatings are quite acceptable if the spinning cycle speed is measurably increased to create such forces as to liquify and spread the coating over the surface to be coated even on more intricate parts.

On the other side of the scale, if the minimum viscosity limits for the compositions are not observed (for instance as with thixotropic compositions with cp below 1,000, such as about 800, the film formed on the metal part may not be continuous. Where this is not essential, such lower viscosity compositions are quite acceptable too. Likewise because of the procedural leeway allowed in the dipspin techniques, such decrease of viscosity of the thixotropic coating compositions may also be acceptable. An adjustment then will be made in the rate of withdrawal of the coated metal part further spinning cycle or the spin time or speed will be decreased correspondingly to compensate for viscosity changes (e.g. decreases). If it is not desired that certain portions or segments of the part be coated, one skilled in the art can mask these portions or segments. Thus it will be seen that it is within the contemplation of the invention that one skilled in the art may operate outside of the preferred parameters disclosed above without avoiding the spirit of the invention.

One skilled in the art could expect the coating composition to be adequately viscous by the use of the amorphous silica alone but unexpectedly the necessary viscosity for purposes of the invention is attributable to the contribution and interaction of both ingredients of the amorphous silica and nonionic surfactant. Indeed coating compositions containing only the amorphous silica even in higher proportions are not satisfactory for the purpose of this invention.

It should be noted that an overlap with respect to the viscosity may exist between the compositions of the invention and those of the prior art. Highly pigmented compositions of the art may have high viscosity, yet not be thixotropic. Such compositions even though of high viscosity exhibit true Newtonian flow behavior rather than thixotropicity. The converse situation also exists. Thus the thixotropicity and the presence of the two ingredients are the more important features of the invention.

It will be noted in that connection that viscosity measurements (cp) of the products disclosed here are made with a Brookfield Helipath LVF. This device measures sheer forces along a vertical path throughout the composition rather than at one location as with other viscosity measuring devices.

In accordance with the invention there is a class of thixotropic compositions which are even more preferred. These thixotropic compositions comprise as briefly described above, insoluble in organic particles which are incorporated in the binder. Among these inorganic particles are aluminum, chromium and zinc. Aluminum particles are most preferred. Ideally the aluminum particles are of a very small size, such as atomized aluminum. The size preferably does not exceed 50 microns and ideally is below 10 microns. It appears that these aluminum or other metal particles play several functions and interact or coact with the other elements of the compositions. Without being fixed to any particular theory, it appears that the aluminum particles react with the chromate/phosphate binder producing a layer of hydrated oxides of dichromium and aluminum on the surface of each particle. These particles interact with the amorphous silica and nonionic surfactant in a manner hereto unknown. Solid particulate materials (metals and non-metals) suitable for admixing to the binder are known. For instance, see the Allen U.S. Pat. No. 3,248,251, (column 8) which is incorporated herein by reference. These aluminum particles form a sacrificial coating on the metal base which further adds to the corrosion resistance of the coated metal part.

In addition to aluminum powder, other pigments may be added such as silicon, magnesium aluminum alloy (e.g. 30–70) powder, or an inert pigment as the oxides of these metals like $Al_2O_3$ or $SiO_2$, etc.

Another group of highly favored thixotropic coating compositions of the inventions are those which contain a reduced chromium component. Such thixotropic coating compositions have properties enhanced by the presence of trivalent chromium (reduced hexavalent chromium) which forms a gel which comprises typically of chromium chromate and/or chromium hydroxide. In accordance with the invention the chromate in the binder is therefore reduced to trivalent chromium such as $Cr(OH)_3$ or $Cr_2(CrO_4)_3$ formed from the soluble hexavalent chromate. These trivalent chromium-containing gels contribute to reinforce the tri-dimensional network.

In accordance with the invention, the above described effect can be accomplished with any chromium-reducing reagent. Suitable for that purpose are hydrogen peroxide, hydrogen peroxide-generating reagents can be used, phosphoric acid, or phosphoric acid-generating reagents especially hypophosphorous acid, phosphorous acid or the salts thereof, such as the alkali metal, alkaline earth metal and the like. Other reducing reagents (organic or inorganic) include the alkanols, such as methanol, ethanol, isopropanol, and the like, formaldehyde, polyhyric alcohols such as ethylene glycol, dextrose, glucose, sorbitol and glycerine, or other equivalent reagents can be used. Preferred among the reducing reagents are those which do not produce extraneous ions which have an adverse reaction on the other components of the system. For instance, hydrogen peroxide is a preferred reagent because the by-product is water. Inorganic and organic peroxides are also suitable. Other preferred reagents are those which are phosphate-generating or phosphate and water-generating. As the reduction takes place the pH increases to approximately 1.5 or higher.

As explained above while the purpose of the invention is primarily to apply the coatings by the dipspin process, the thixotropic coating compositions may also be sprayed on, rolled on, brushed, dipped or flow or coil-coated. When, in accordance with the invention, the dipspin process is used, the process of the invention proceeds as described above.

In accordance with the invention any metal may be coated with the composition of the invention including steel, stainless steel, aluminum, titanium, i.e. any metal that can be heated to an appropriate curing temperature, e.g. approximately 525° F. Likewise alloys of these metals can be coated. While especially desirable for coating metal parts, non-metallic surfaces may be coated also, like plastic, ceramics, fibrous, etc.

As discussed above, though intricate, configurations of the metals are ideally suited for the coating composition of the invention. The coatings can be applied by dipping or brushing or by using more traditional methods. Other metal configurations of the parts can likewise be coated.

In accordance with the invention there is therefore made available an ideal thixotropic coating for intricate metal parts ideally suited for the dipspin techniques. This composition supercedes bulk process and the plating techniques used heretofore. It also provides as disclosed above, very significant savings in time and in material over for instance, the spraying process. Thus, in accordance with the invention, a new technology is being introduced.

In accordance with the invention it will be noted also that the coating or film on the metal part may be made very uniform such as about 0.5 ml±0.1. This is particularly advantageous when metal parts are of intricate design and shape which then need to be fitted together, such as screws and washers which need to be threaded together.

In accordance with another aspect of the invention as has been disclosed above, the coated part may then be further coated with a top coat to add any desired characteristics such as increased lubricity, coatings for UV resistance, light resistance, detorque resistance and have the appearances of a metallic or zinc plated part. Yet, parts so produced in accordance with the invention, will have remarkably greater corrosion resistance and other desirable properties. Moreover, coated parts produced in accordance with the invention may also be given a post treatment of an inorganic top coat containing a ceramic oxide and other types of pigment thereby increasing the heat resistance.

Thus, the coated parts produced in accordance with the invention are ideally suited for application of additional top coats or post treatments for making them even better suited for the desired application.

From the above disclosure it will now be appreciated that a significant contribution has been made in the field of coating metal or non-metallic parts.

The following examples are illustrative of the invention and are not intended to be limiting. It is evident to one skilled in the art that the ingredients of the various compositions illustrated, their relative proportions and amounts, as well as other variables and parameters can be modified while being within the scope and the contemplation of the invention, and that the equivalents of what is disclosed herein are also contemplated to be within the scope of the invention.

EXAMPLE 1

A binder for use in the composition of the invention is prepared as follows.

MgO: 7.25 g
Chromic acid: 9.2 g
Phosphoric acid (85%): 22 ml
Water (deionized): 80 ml A composition of the invention is prepared by mixing 100 ml of the binder with 80 g of aluminum powder (−325 mesh, average particle size 4-6 microns), 4 g of fumed silica and 0.025 ml of Triton X-100.

The aluminum powder is added to the liquid with mixing under high shear. The fumed silica is added under also with high shear, followed by the surfactant, which is added with short, rapid high shear mixing.

The composition has an initial high viscosity of 6,225 cp. The pH of the composition is 2.07.

Steel parts such as screws, bolts, and fasteners are dip-coated with the composition. The coatings are dried in a drying cycle at 175° F. followed by a curing step at 650° F. for thirty minutes. To prepare a galvanically active surface the coating can be mechanically cold worked or thermally treated at 1,000° F. for two hours.

The coating had remarkable increased shelf stability; it did not separate on standing at room temperature for over two months, i.e. the pigment did not form a layer at the bottom of the container. Considerable savings in materials and costs were effectuated over the spray method of conventional coating composition.

The parts coated in accordance with the invention had excellent resistance to standard salt-spray and corrosion tests.

Using the same composition, metal parts were spin coated very satisfactorily and then the coating was dried at 180° F. and cured at 680° F.

EXAMPLE 2

Another coating composition is prepared as follows by mixing the following ingredients:

Magnesium oxide: 18.6 g
Chromic acid: 91.3 g
Phosphoric acid (85%): 273.4 g
Magnesium carbonate: 57.9 g
Water: 644 g The following mixture is prepared:
Above binder: 720 g
Aluminum powder (−325 mesh, particle size; average 4-6 micron): 684 g
Hydrogen peroxide (35%): 16 g
Fumed silica (Cab-O-Sil M-5): 24 g
Triton X-100: 0.22 g The composition has an initial viscosity in the range of 8,000 to 12,000 cp which dropped to 4,500 cp, at which it remains stable. The composition is ideally suited for application by dipspinning to metal fasteners. After application, the coating is cured at 700° F. for ten minutes.

If desired, a conventional pigmented coating may be applied by conventional techniques on the above-coated part.

The compositions of the invention generally have a solid content in the range of 30 to about 70, preferably from about 55 to about 65 for the metallic films. For top-coats, (non-metallic) films from about 30 to about 55 of solid contents are generally acceptable.

This coating was applied to phosphated steel fasteners using a "dipspin" apparatus, then cured at 525° F. for ten minutes.

A second coat was then applied and cured likewise. A top coat of suitable paint was then applied and cured at the same temperature.

The fasteners coated with this coating composition exceeded one thousand hours of salt spray exposure testing The coating was applied by dipspinning and cured on (cylindrical-shaped) ceramic plugs. Each plug, including its cavity, was evenly coated.

By suitable selection of the metal additive to the binder, there results an electrically conductive coating on a ceramic part.

Parts made of synthetic plastics can also be coated with the coatings of the invention. For instance phenolic resins, polyacrylates, polymethacrylates and polycarbonates are illustrative of the plastics. The plastic should be stable at the curing temperature of the coating composition, such as about 350° F.

EXAMPLE 3

Example 2 was repeated, but silicon was added, in addition to the aluminum powder. Metal parts coated with the compositions were highly resistant to extreme weathering conditions. The exposure of the part to salt spray testing was remarkably improved.

EXAMPLE 4

Example 2 was repeated, but there was added in addition to the aluminum powder, magnesium-/aluminum alloy (30/70) powder. Metal parts coated with the compositions were highly resistant to extreme weathering conditions. The exposure of the part to salt spray testing was remarkably improved.

EXAMPLE 5

Example 2 was repeated, but there was added in addition to the aluminum powder, $Al_2O_3$. Metal parts coated with the compositions were highly resistant to extreme weathering conditions. The exposure of the part to salt spray testing was remarkably improved.

EXAMPLE 6

Example 2 was repeated, but there was added in addition to the aluminum powder, $SiO_2$. Metal parts coated with the compositions were highly resistant to extreme weathering conditions. The exposure of the part to salt spray testing was remarkably improved.

EXAMPLE 7

Instead of using Triton X-100, there was used Triton N-101 (alkyl group is nonyl), Triton X-35 (alkyl group is octyl), Valdet (alkyl group is nonyl), Tergitol L2-P-6 (alkyl group is dodecyl).

The amounts of nonionic wetting agent when varied from 0.02 to 0.8% of total solids gave compositions of appropriate thixotropicity for coating the metal parts.

EXAMPLE 8

Another binder was prepared mixing the following:
Magnesium oxide: 72 g

Chromic acid: 92 g
Phosphoric acid (85%): 323 g
Water: 1000 ml
Aluminum powder (spherical, 5–10 micron): 800 g
This coating had a viscosity of 581 cp.
To this coating there are added the following ingredients:
To 1,000 ml of the coating there were admixed the following: 40 g of fumed silica, 15 ml of $H_2O_2$ (35%), 0.5 ml of Triton X-100.

A variety of irregularly shaped metal parts (coil springs and screws) were placed in the dipspin centrifuge basket, dipped into the coating vat containing the coating composition, removed and spun, spinning off excess coating. The basket was removed. The parts were air-dried until they had a matte gray appearance and then placed in an oven at 650° F. for thirty minutes.

To improve coverage of the part, the basket was slightly agitated and the steps described above were repeated.

To make the coatings on the metal parts electrically conductive, the cured parts are burnished in a blaster using aluminum oxide grit (or glass beads at low pressure) until coatings are electrically conductive.

If desired, a top coat with a thickened binder composition or a top coat with an organic paint-like coating may be applied.

Another batch of metal bolts, screws, and fasteners are very satisfactorily coated in a dipspin apparatus to give an even and smooth coating which allowed for very close tolerances of metal fitting parts. The parts were subjected to a drying cycle at 175° F. and a curing step at 650° F. for thirty minutes.

The coating in all cases did not have a layer which could be removed by brushing or similar physical action.

In all cases the compositions described had prolonged shelf stability, i.e. did not separate in their components upon storage at 25° C. for over three months.

EXAMPLE 9

The following ingredients are mixed.
$MgCr_2O_7.6H_2O$: 348 g
$H_3PO_4$ (85%): 98 g
$Mg(H_2PO_4)_2.3H_2O$: 272 g
$H_2O$ (distilled): 800 g
aluminum powder (Atomized, 5 micron average): 400 g
aluminum/magnesium alloy Powder, (70% Aluminum, weight %): 600 g
fumed silica (Cab-O-Sil M-5): 36 g
nonionic surfactant (CO-977 Igepal): 2.1 g
pH: 2.85
Viscosity before fumed silica: 740 cp
Viscosity after fumed silica: 913 cp
Viscosity after nonionic surfactant: 11,288 cp This is a composition based on that disclosed by Brumbaugh (U.S. Pat. No. 3,869,293). Steel parts are coated by dipspinning and the coating is dried and cured at 650° F. for 25 minutes.

In this example several other aluminum/magnesium alloys are suitable, for instance a 90/10 and a 50/50 Al/Mg alloy.

EXAMPLE 10

Other compositions constituted of mixtures of aluminum magnesium alloy and phosphate-chromate-metal-ion solution as disclosed by the above-mentioned Brumbaugh patent are prepared, specifically those of the examples 1–3 and 4–11. With each one there is admixed fumed silica (in a proportion of 2 to 5 percent by weight of total solids) and nonionic surfactant in a proportion of 0.02 to 0.6 percent by weight of total solids.

In the compositions of examples 1–3, there was used, respectively, Carbowax 1400 (a polyethylene glycol), Tergitol 12-P-12 (a dodecyl ethoxylated alkylphenol) and Neutronyx 676 (an ethoxylated nonylphenol). In the compositions of examples 4–11, there was used, respectively, these same nonionic surfactants and Triton N-57, X-35, X-100 and X-305, respectively. The three first compositions and those of examples 4–6 include PTG-amorphous fumed silica, and those of examples 1–11, Ouso 32 (precipitated silica).

Steel screws and coils are coated by dipspinning and the coating is dried and cured as discussed above.

EXAMPLE 11

The following ingredients are mixed.
MgO: 300 g
$Al(OH)_3.XH_2O$ (Aluminum Hydroxide Gel): 60 g
$CrO_3$: 240 g
$H_3PO_4$ (85%): 1520 g
$H_3PO_2$ (50%): 25 g
$H_2O$ deionized: 3000 g
$SiO_2$ (PTG-amorphous fumed silica): 105 g
nonionic surfactant (CO-977 Igepal): 7 g The composition, which has a gel-like consistency, has the following characteristics.
pH: 2.2
Viscosity before silica addition: 747 cp
Viscosity after silica addition: 747 cp
Viscosity after surfactant addition: 1909 cp In this example the chromate is partially reduced with the hypophosphorous acid creating chromium chromate which contributes to the gel formation. No pigment is added. This is a suitable top coat for metallic pigmented coatings.

Instead of using hypophosphorous acid there can be used the alkali metal, the alkaline earth metal and like salts, for instance the sodium or potassium salt of the acid. Likewise hydrogen peroxide is suitable for replacing the hypophosphorous acid.

EXAMPLE 12

A similar composition in which the surfactant is Triton X-100 is well suited for application by dipping on steel springs.

EXAMPLE 13

A coating composition of the type disclosed by Wydra (U.S. Pat. No. 3,857,717) is prepared. No cations are added but phosphorous acid is used to react with some of the chromic acid producing trivalent chromium and phosphoric acid in situ.
$H_2O$ (deionized): 295 g
$H_3PO_4$ (85%): 87 g
$H_3PO_3$: 42 g
$CrO_3$: 62 g
$SiO_2$ (−325 mesh): 400 g
Precipitated silica (Quso 32): 12 g
nonionic surfactant (Carbowax 14000): 4 g
pH: 0.5
Viscosity before precipitated silica addition: 664 cp
Viscosity after precipitated silica: 747 cp
Viscosity after nonionic surfactant: 1577 cp This is an excellent heat-curable dip coating. It provides oxidation protection to steel and also provides electrical insulation when steel fasteners are dip-coated and the coating is cured.

EXAMPLE 14

A coating composition of the following ingredients is prepared. No coatings are added.

$H_2O$: 400 g
$H_3PO_4$ (75%): 80 g
$CrO_3$: 30 g
aluminum powder (−325 mesh): 200 g
fumed silica (Aerosil-200): 18 g
nonionic surfactant (Triton X-100): 0.06 g
pH: 0.25
Viscosity before silica addition: 496 cp
Viscosity after silica addition: 747 cp
Viscosity after surfactant addition: 1494 cp The batch of lock washers is dipspin coated. The coating is cured at 650° F. The coating composition is stable; the pigment did not separate to the bottom.

EXAMPLE 15

A coating composition of the type disclosed by Collins (U.S. Pat. No. 3,248,249) was prepared, mixing the following components:

$H_3PO_4$ (85%): 338 g
MgO: 50 g
$Mg(H_2PO_4)_2 3H_2O$: 50 g
$MgCr_2O_7 \cdot 6H_2O$: 150 g
water to 1000 cc: 250 g
fumed silica (Cab-O-Sil M-5): 90 g
nonionic surfactant (triton X-100): 0.12 g
pH: 1.45
Viscosity before silica addition: 581 cp
Viscosity after silica addition: 581 cp
Viscosity after surfactant addition: 11,371 cp This is Example 1 from the Collins patent (U.S. Pat. No. 3,248,249). There is no $Cr^{+6}$ reduction and no particulate pigment. If the fumed silica were added at low levels, i.e. at 1–3% based on total UV (weight), little thickening would occur.

EXAMPLE 16

A composition of the type illustrated by Collins (U.S. Pat. No. 3,248,250) is prepared (without the sodium silicate) in accordance with this invention as follows:

$CrO_3$: 92 g
$H_3PO_4$ (85%): 98 g
$Mg(H_2PO_4)_2 \cdot 3H_2O$: 272 g
$H_2O$: 720 g
aluminum powder 5 micron average: 600 g
fumed silica (Cab-O-Sil M-5): 95 g
surfactant (Triton X-100): 0.1 g
pH: 0.8
Viscosity before silica addition: 664 cp
Viscosity after silica addition: 1494 cp
Viscosity after surfactant addition: $1.5 \times 10^6$ The Collins compositions do not have the properties called for by the compositions of the invention. They are not thixotropic and unsuitable for spin-coating metal parts.

Other compositions prepared with the binder compositions shown in Examples 1 and 3 of Collins to which are added Triton X-100 (0.02%) and fumed silica (100 g/liter) yield thixotropic compositions which are well suited for dip or spin-coating of metal parts.

Although the present invention has been described with reference to the most preferred embodiments therein set forth, it is understood that the present disclosure has been made only by way of example and the numerous changes in the details of the compositions may be resorted to without departing from the spirit and scope of the invention. Thus, the scope of the invention should not be limited by the foregoing specification, but rather only by the scope of the claims appended hereto and the functional equivalents.

We claim:

1. A part coated with a cured coating composition which comprises (a) an acid binder aqueous solution which comprises phosphate ions and ions of the group of chromate ions or molybdate ions, (b) an acid-stable amorphous silica, and (c) a non-ionic surfactant, said silica being crosslinked with said surfactant.

2. The part of claim 1 which is a metal part.

3. The spin coated metal part of claim 2.

4. The spin coated metal part of claim 3, which metal part has a convoluted shape, or grooves or comprises at least two closely fitting separable portions.

5. The spin coated metal part of claim 4, which metal part is a fastener, screw, spring, coil, bolt, nut, washer, valve clip or wire.

6. The part of claim 1 wherein the amorphous silica is of said composition and is free of stabilizing ions.

7. The part of claim 1, wherein the amorphous silica of said composition was fumed silica.

8. The part of claim 1 wherein the amorphous silica of said composition is an aggregate or agglomerate of a size of about 1 to about 5 microns of particles of an average particle size of less than about 1 micron.

9. The part of claim 1 which is heat cured.

* * * * *